May 7, 1963 J. H. R. THORNHILL 3,088,394
APPARATUS FOR EXTRACTING SOLUBLE CONSTITUENTS
FROM VEGETABLE MATTER
Filed March 22, 1961 6 Sheets-Sheet 1

Inventor
John H. R. Thornhill
By Stevens Davis, Miller & Mosher
Attorneys

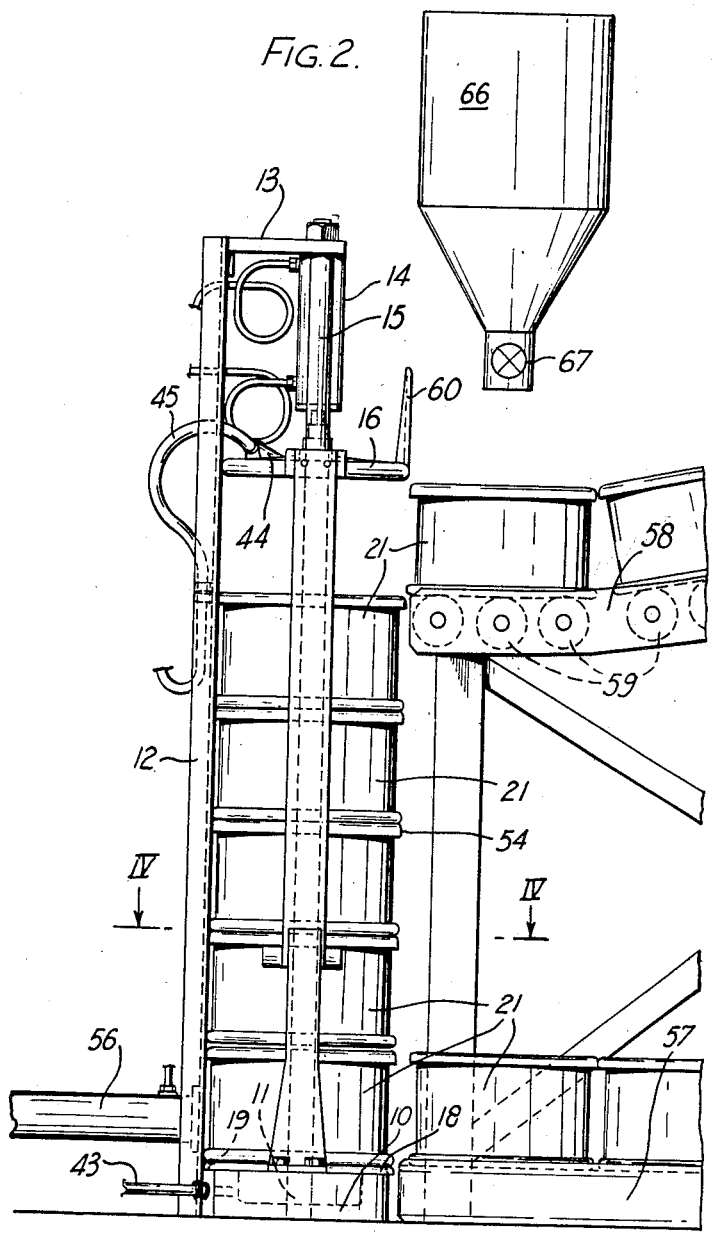

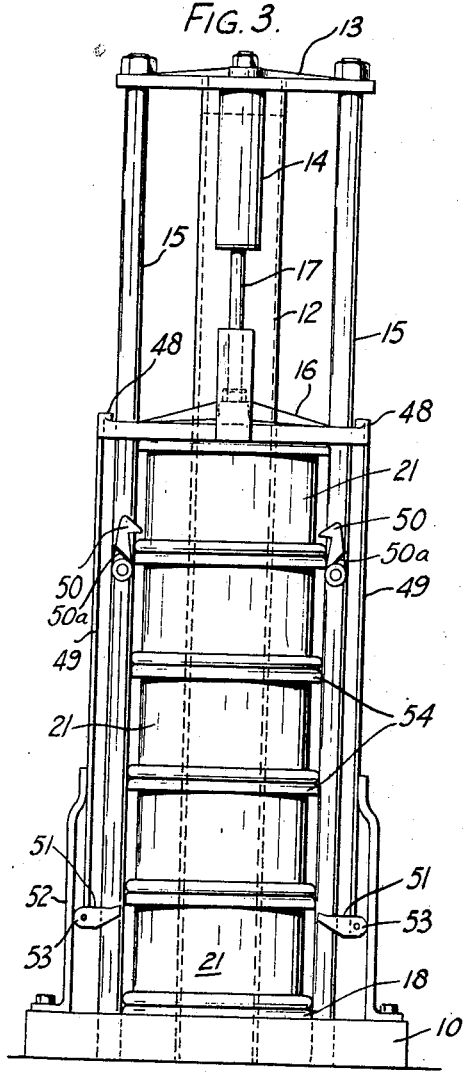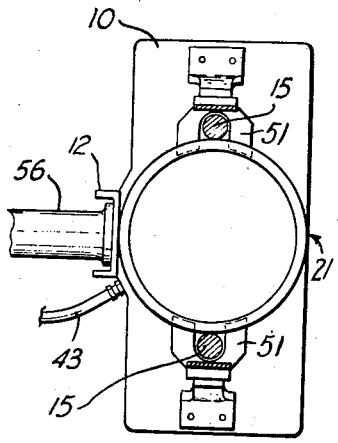

May 7, 1963　　J. H. R. THORNHILL　　3,088,394
APPARATUS FOR EXTRACTING SOLUBLE CONSTITUENTS
FROM VEGETABLE MATTER
Filed March 22, 1961　　　　　　　　　　　　6 Sheets-Sheet 4
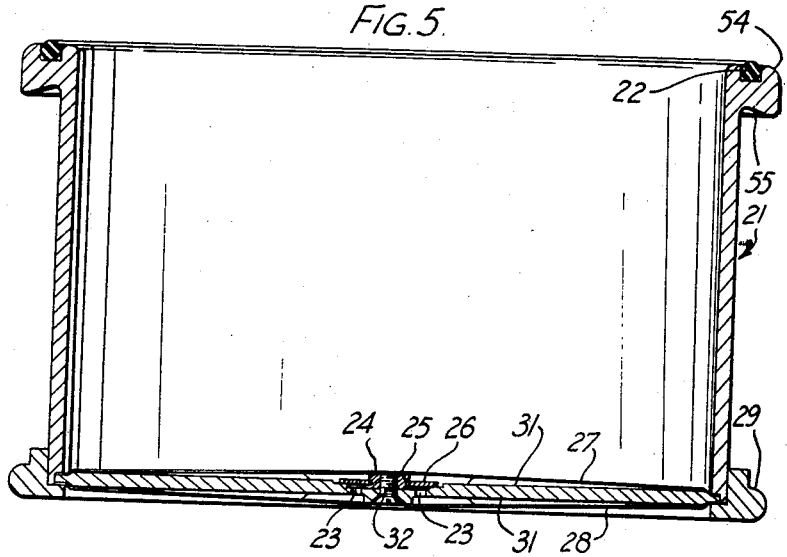
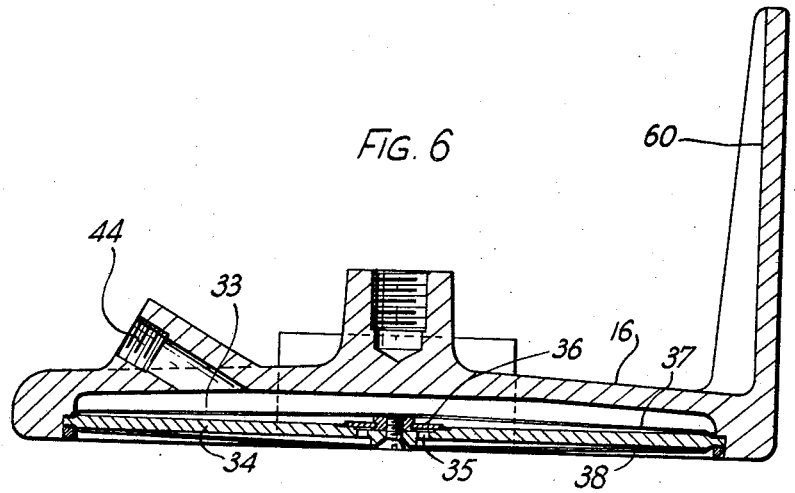
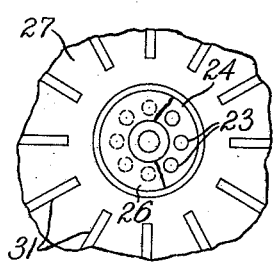
Inventor
John H.R. Thornhill
By Stevens Davis Miller & Mosher
Attorneys

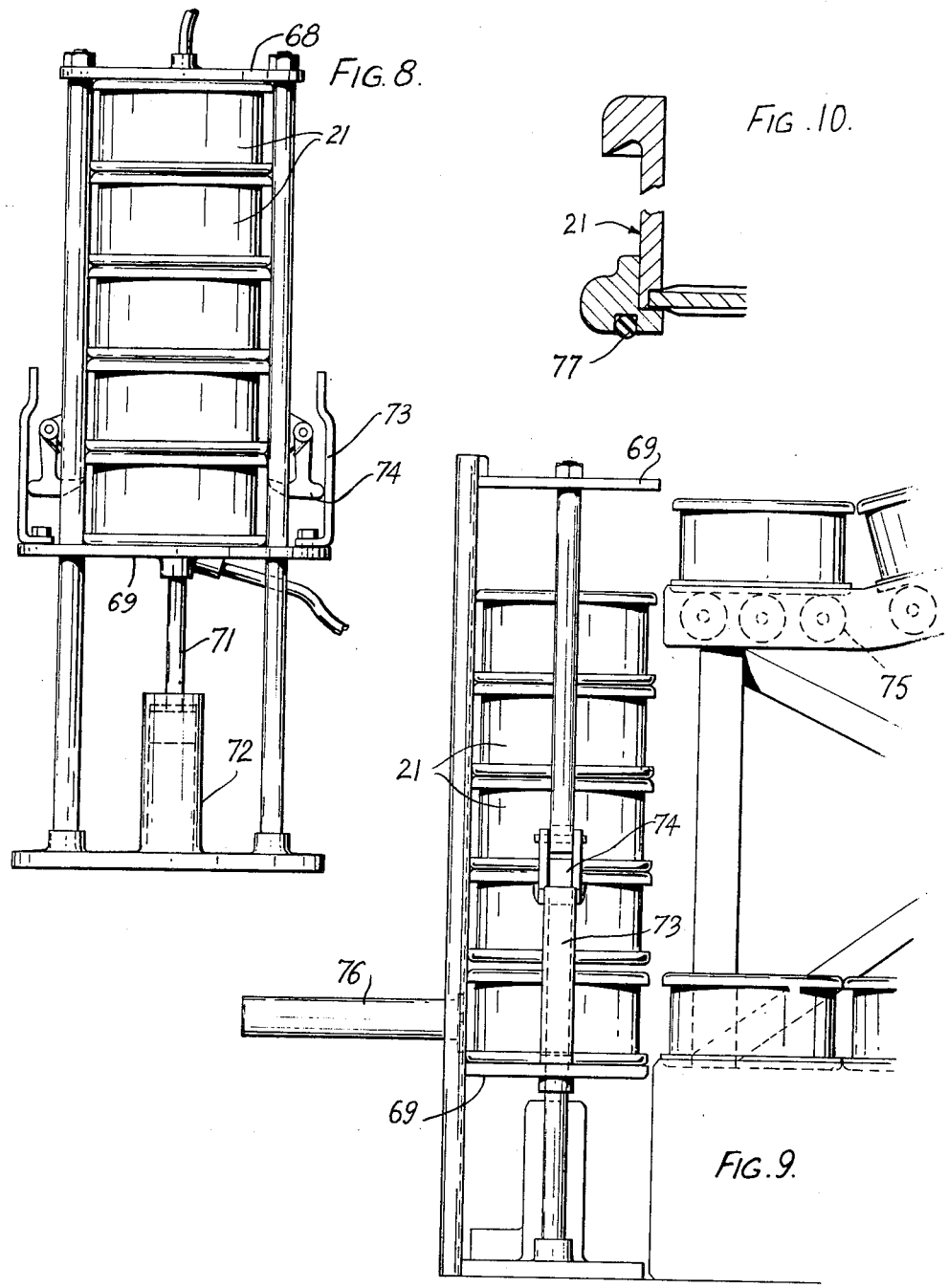

May 7, 1963 J. H. R. THORNHILL 3,088,394
APPARATUS FOR EXTRACTING SOLUBLE CONSTITUENTS
FROM VEGETABLE MATTER
Filed March 22, 1961 6 Sheets-Sheet 6
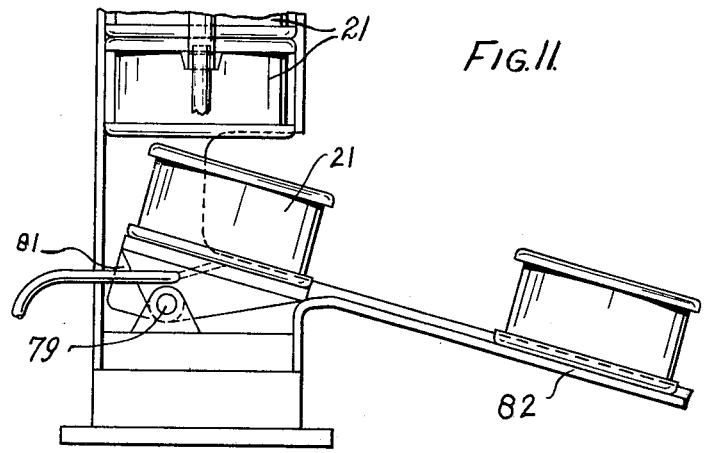
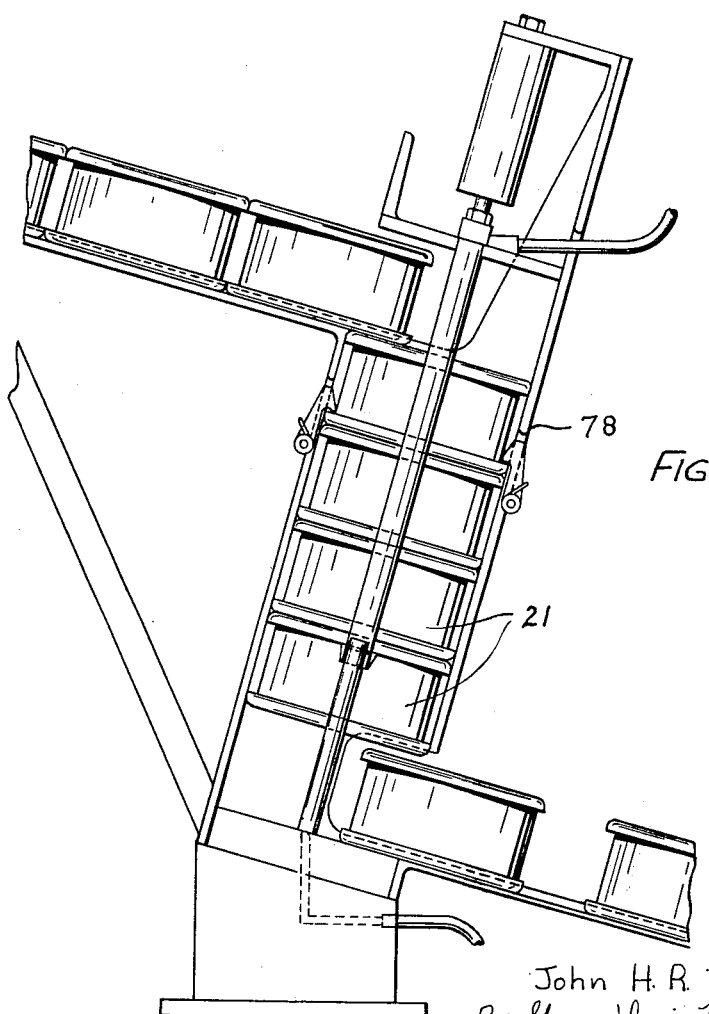
Inventor
John H. R. Thornhill
By Stevens, Davis, Miller & Mosher
Attorneys 3,088,394
APPARATUS FOR EXTRACTING SOLUBLE CONSTITUENTS FROM VEGETABLE MATTER
John H. R. Thornhill, Denawaka Estates Limited, Pelmadulla, Ceylon
Filed Mar. 22, 1961, Ser. No. 97,634
18 Claims. (Cl. 99—283)

This invention relates to apparatus for extracting soluble constituents from vegetable matter, of the kind in which a solvent is caused to pass through pans containing the vegetable matter from which the soluble constituents are to be extracted.

The invention has for its object to provide an apparatus which is efficient and reliable in operation.

According to the invention, in apparatus for extracting soluble constituents from vegetable matter means are provided for passing a liquid upwardly through a stack of pans each having an opening in its base, the pans being stacked between a base and a head provided respectively with an inlet and an outlet for the liquid and means being provided for removing pans one-by-one from the bottom of the stack, and adding pans one-by-one to the top of the stack. Means are preferably provided for effecting relative movement, in the direction of the axis of the stack, of the head, the base and the stack of pans excluding the lowermost pan, to enable the said lowermost pan to be removed and a fresh pan to be inserted at the upper end of the stack.

Further, according to the invention, apparatus for extracting soluble constituents from vegetable matter comprises a fixed base, means supporting a head for vertical movement above the said base, a plurality of pans adapted to form a stack supported on said base with the head closing the topmost pan, each pan having an upwardly opening non-return valve in its base, means providing fluid tight joints between the fixed base, the adjacent pans and the head, means for introducing a liquid into the base for upward flow through the pans to an outlet in the head, lifting apparatus for lifting the head away from the uppermost pan and then lifting all the pans except the lowermost, so that the lowermost pan can be displaced laterally from the stack and another pan inserted between the uppermost one in the stack and the head.

Preferably, a conveyor is provided to carry the fresh pans into position for insertion in the stack, and a ram is provided to displace the lowermost pan from the stack.

The lifting means, the ram and valve means controlling the flow of liquid through the pans may be controlled automatically by a timing mechanism so that pans are removed and inserted at predetermined intervals and the liquid flow is stopped during the removal and insertion of the pans.

Each pan may have an upwardly-opening non-return valve to control the opening in its base, a mesh screen or screens being provided in the said base to restrain the upward flow of undissolved material and to prevent clogging of the non-return valves.

The non-return valves may comprise discs of flexible material secured at their centres to the upper surfaces of the pan bases and extending over apertures in the said bases.

Each pan may be formed with an upwardly adapted groove in its upper edge to receive a packing ring adapted to engage a pan resting on it or to engage the undersurface of the head.

The lifting means may comprise a fluid-pressure operated ram or rams acting on the head, lifting arms operated by the ram or rams being arranged to come into lifting engagement with the pan next to the lowermost pan after a predetermined upward movement of the head.

The invention is hereinafter described with reference to the accompanying drawings which show, by way of example, one embodiment of apparatus according to the invention. In the drawing:

FIGURE 2 is a side elevation similar to FIGURE 1 but showing a fresh pan being inserted at the top of the stack and the lowermost pan being removed;

FIGURE 3 is a front elevation with the parts in the same positions as in FIGURE 1;

FIGURE 4 is a sectional plan on the line 4—4 of FIGURE 2;

FIGURE 5 is a sectional elevation of a pan on a larger scale than FIGURES 1 to 4;

FIGURE 6 is a sectional elevation of the head on the same scale as FIGURE 5;

FIGURE 7 is a partial plan view of the pan shown in FIGURE 5;

FIGURE 8 is a front elevation similar to FIGURE 3 showing a modified arrangement;

FIGURE 9 is a side elevation of the arrangement shown in FIGURE 8;

FIGURE 10 is a detail view, similar to part of FIGURE 5, showing a modified arrangement of the packing rings associated with the pans;

FIGURE 11 is a partial side elevation of another modified arrangement; and

FIGURE 12 is a side elevation of a further modified arrangement.

Figure 1:
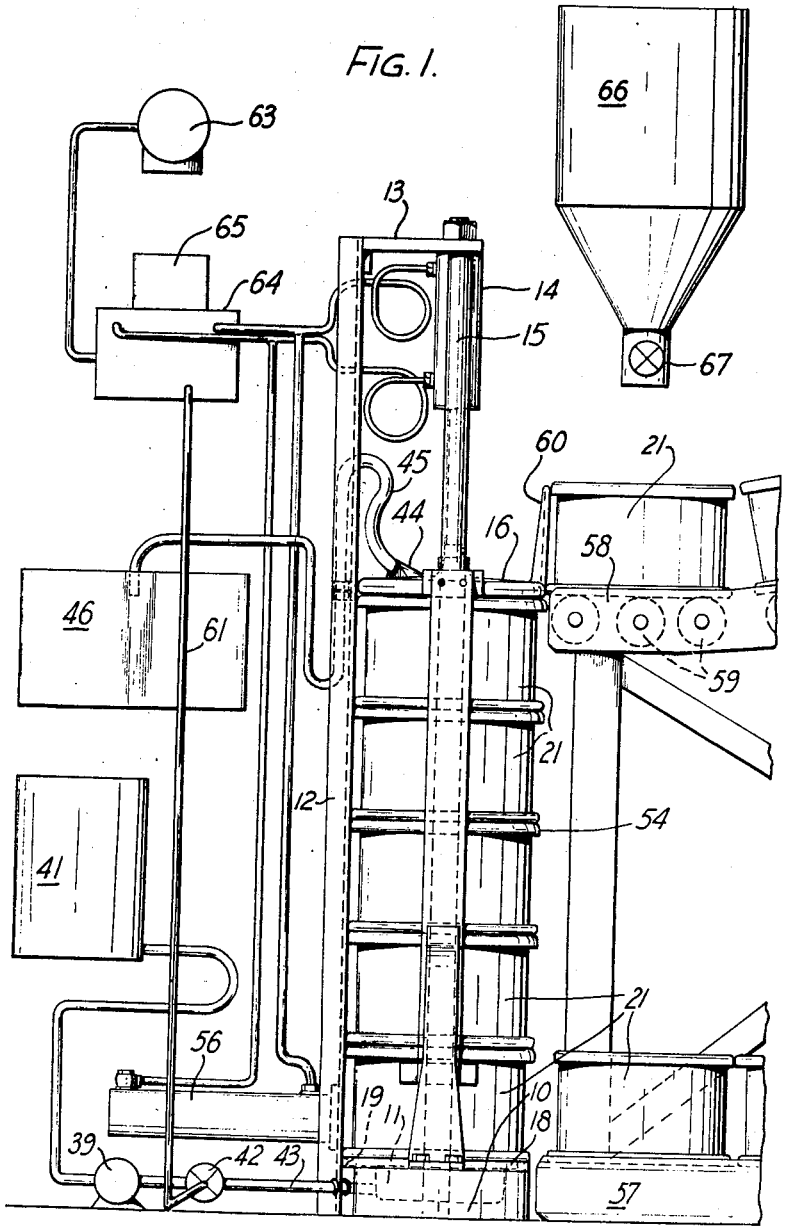
FIGURE 1 is a side elevation of the apparatus with the stack of pans in the operative position.

Referring to FIGURES 1 to 3 the apparatus comprises a base 10 formed with a cavity 11 which is open at the top. A pillar 12 fixed to the base 10 extends upwardly at one side thereof and carries at its upper end a bracket 13 on which is mounted, with its axis vertical, a ram cylinder 14. A pair of guide rods 15, 15 extend between the base 10 and the bracket 13, the guide rods 15 lying in a vertical plane containing the axis of the cylinder 14, one on each side of the said axis and being symmetrically disposed with relation to the pillar 12. A head 16, slidably mounted on the guide rods, 15 is fixed to a ram 17 slidable in the ram cylinder 14, so as to be movable upwardly and downwardly by the said ram.

The base 10 is formed on its uppersurface with a circular platform 18, concentric with the ram cylinder 14, the platform 18 being grooved on its upper face near its edge to receive a packing ring 19, the groove and packing ring being similar to the groove and the packing ring 22 shown in association with a pan 21 in FIGURE 5.

Cylindrical pans 21 are stacked on the platform 18, the lowermost pan resting on the platform and each other pan resting concentrically on the pan below it, the head 16 serving to close the uppermost pan. Each pan 21, as shown in FIGURE 5, is open at the top, and has an upwardly facing groove around its top edge to receive a packing ring 22, so that fluid tight joints are made betwee neach pan and the one above it, and a similar fluid-tight joint is made between the uppermost pan 21 and the head 16. The packing ring 19 makes a similar fluid-tight joint between the base platform 18 and the lowermost pan 21.

Each pan 21, as shown in FIGURES 5 and 7, is formed with a ring of apertures 23 in its base, surrounding a central nut 24, the nut being grooved at 25 to locate and retain, above the base, a flexible disc 26 covering the apertures 23. The outer edge of the disc 26 is free, so that it can lift away from the base and act as a non-return valve.

Above and below the base there are mounted mesh screens 27 and 28 respectively, made, for example, of wire mesh or expanded metal, the outer edges of the said screens, and the edge of the base, beld held between the lower edge of the side wall of the pan and a flanged ring 29 secured to the said wall. The screens are spaced from the base of the pan 21 by radial ribs 31 on the surfaces of the said base, and the lower screen 28 is secured to the base of the pan at its centre by being clamped between the head of a screw 32 and a countersunk surface around a hole in the base of the pan through which the screw extends into a screw-threaded hole in the nut 24. The radial ribs 31 are shown in the plan view, FIGURE 7, part of the upper gauze screen 27 being broken away for clarity.

The head 16, as shown in FIGURE 6, is formed with a downwardly-opening cavity 33 closed by a disc 34 similar to the bases of the pots 21 and provided with similar apertures 35 covered by a flexible disc 36. Mesh screens 37 and 38 are provided above and below the disc 34, corresponding to the screens 27 and 28 on the pans 21.

A pump 39 draws hot water from a boiler 41 or other water heating device and delivers it through a valve 42 and a conduit 43 into the cavity 11 in the base 10. The cavity 33 in the head is connected at 44 to a flexible conduit 45 leading to a liquid receiving tank 46. Hot water can thus be passed upwardly through the pans 21 and delivered to the tank 46.

The head 16 is formed with a pair of limbs 48, 48 projecting beyond the guide rods 15, each said limb having fixed to it a resilient dependent arm 49 to the lower end of which is fixed a lifting claw 51 notched as shown in FIGURE 4 to embrace the guide rod 15, the resilience of the arms causing their lower ends to tend to move outwardly. Cam bars 52, 52 mounted on the base are cranked inwardly at their upper ends and serve to limit the outward movement of the lower ends of the arms 49, the lifting claws 51 having heel portions 53 which project outwardly beyond the outer faces of the arms 49, so that when, as the arms 49 are moved upwardly by the ram 17, the lifting claws are deflected inwardly by the cam bars.

Each pan 21 has a flange 54 around its upper edge, the said flange being undercut as shown at 55 in FIGURE 5 to receive the lifting claws 51.

Pawls 50 mounted on the guide bars 15, act to limit the upward movement of the pans by engaging the ring 29 on the uppermost pan, the pawls being movable outwardly against loading springs 50a to enable that pan to move downwardly past them.

A horizontally-acting pneumatic ram unit 56 is mounted on the pillar 12 just above the base 10 to displace the lowermost pan 21 from the base 10 on a collecting platform 57. A ramp 58, provided with rollers 59, is provided to convey pans 21 to the top of the stack. The head 16 is formed with an upstanding wall 60 against which a pan 21 on the ramp 58 waiting to be added to the stack rests when the head is in its lower position.

Air under pressure for operating the ram 17, the ram unit 56 and the value 42 is provided, for example, by an air compresser 63, the supply of air under pressure for effecting the various operations being controlled by a multiple valve unit 64 which is itself controlled by a timing mechanism 65 to provide the desired interval between the pan-changing operations and the correct sequence of movements during the changing operation. This sequence comprises first closing the valve 42 and then simultaneously operating the ram 17 to lift the head 16 and pans 21 in a manner described below (excluding the lowermost pan), and operating the ram unit 56 to remove the lowermost pan. A series of fresh pans is maintained on the ramp 58, and the first of these slides automatically under the force of gravity on to the uppermost pan in the stack. The ram unit 56 is then retracted, and the ram 17 operated to lower the pans and head, and the valve 42 is reopened.

A hopper 66 is mounted above the position occupied by each pan 21 whilst it is waiting to enter the stack, a metering valve 67 being provided in the bottom of the hopper to enable a measured quantity of material to be treated to be fed into each pan at this position.

The apparatus illustrated in the drawings is primarily designed for the extraction of soluble matter from tea leaf material in order to produce a tea concentrate, and the apparatus operates in the following manner.

With the pans 21 forming the stack partly filled with tea leaf material and with the stack in the position shown in FIGURES 1 and 3, hot water is passed through the pans in an upward direction for a predetermined time, controlled by the timer 65 and, at the end of that time, a sequence of operations is started to remove the lowermost pan 21 and insert a fresh pan 21, partly filled with tea material from the hopper 66, at the top of the stack.

The valve 42, is first closed to stop the flow of water, and the ram 17 is then operated in an upward direction pressure being simultaneously applied to the ejection ram 56. Since the lifting claws 51 are too widely spaced to engage the flange 54 on the lowermost pan, only the head 16 is first lifted, but when the ram has moved through a distance somewhat less than the height of a pan, the lifting claws 51 are displaced inwardly by engagement of their heel portions 53 with the cranked portions of the cam bars 52 and, when the head 16 has risen through a distance slightly more than the height of a pan, the claws 51 engage the undercut flange 54 on the next lowermost pan 21 and lift it through a small distance until the pawls 50 engage the ring 29 on the uppermost pan and stop the upward movement. Since the head 16, as just mentioned, has lifted by a total distance slightly more than the depth of a pan before the claws 51 start lifting the next lowermost pan and the ones above it there is now a space between the head 16 and the uppermost pan 21 sufficient to receive a fresh pan, and the lowermost pan 21 is free to be moved away by the ejection ram 56 which is already under pressure. The pan 21 at the lower end of the ramp 58 now slides under the influence of gravity into the space between the head and the uppermost pan. The ram unit 56 is then retracted, and simultaneously with the retraction of ram unit 56 the ram 17 is moved downwardly, lowering the stack of pans until the one now lowermost rests on the platform 18, and bringing the head 16 down into engagement with the top of the uppermost pan. The valve 42, is then re-opened to restart the flow of water, and the cycle is repeated continuously, each pan moving step-by-step down the stack until it is ejected at the bottom.

The discs 26 act as non-return valves to prevent water from escaping downwardly from the pans during the changing operations, and the mesh screens 27, 28 and 37, 38 restrain the upward flow of undissolved material and prevent the said non-return valves from being clogged by the tea leaf material.

The packing rings 19 and 22, as well as preventing leakage of water whilst flow is taking place, ensure that any volatile constituents released from the tea leaves are carried away with the water and can be subsequently collected if desired.

It will be understood that the pans, instead of being circular, may be square or rectangular, and that the non-return valves may be of a form other than that specifically described. FIGURES 8 and 9 of the drawings show a modification in which the pans 21 are stacked between a fixed head 68 and a vertically movable base 69 capable of being lifted and lowered by a ram 71 slidable in a ram cylinder 72. The base 69 carries cam bars 73 which operate pawls 74 to limit downward movement of the next lowermost pan 21 and those above it when the base 69 is lowered, so that sufficient space is left between the uppermost pan 21 and the head for the entry of a fresh pan 21 from a ramp 75, while allowing the base to descend further and free the lowermost pan 21 for ejection by a ram 76. FIGURE 8 shows the base 69 raised to hold the stack closed, while FIGURE 9 shows it lowered to enable the pans to be changed.

The packings between the stacked pans, instead of being housed in grooves at the tops of the pans as shown in FIGURE 5, may be housed in grooves at the bottoms of the pans as shown at 77 in FIGURE 10, a similar packing being mounted in the head 16 or 68. As shown in FIGURE 12, the stack of pans 21 may be inclined to the vertical being mounted in a cylindrical guide 78 to hold them in alignment, so that the lowermost pan 21 will slide out of the stack automatically under gravity when the other pans are lifted, and the fresh pan will also slide into position at the top of the stack.

The base may be mounted for tilting movement about a horizontal axis to allow the lowermost pan to slide off it, thus avoiding the need for the pusher ram described above. For example, as shown in FIGURE 11, the base 11 may tilt about an axis 79 offset to one side of its centre and may be provided with a counterweight 81 so arranged that, with the weight of a pan 21 thereon, it tilts automatically to release the pan on to a ramp 82 when the other pans 21 are lifted, but returns to the horizontal position when the pan has slid off.

The apparatus according to the invention may be used for extracting soluble constituents from vegetable matter other than tea and, the water in which the extraced constituents are dissolved may be subsequently wholly or partially evaporated to produce a liquid or dry concentrate of the said constituents.

It has been found that when working with some forms of vegetable matter, such as tea, the said matter, provided that a suitable quantity is placed in the pan, swells when wetted to such an extent that downward flow of liquid through it under gravity is substantially inhibited, and the non-return valves in the bases of the pans can be dispensed with.

I claim:

1. Apparatus for extracting soluble constituents from vegetable matter wherein means are provided for passing a liquid upwardly through a stack of pans each having at least one opening in its base, the pans being stacked in communication with one another between a base and a head provided respectively with an inlet and an outlet for the liquid sealing means provided between said base, each pan and said head to form a hermetic seal therebetween, and means being provided for effecting relative movement, in the direction of the axis of the stack, of the head, the base and the stack of pans excluding the lowermost pan, to enable the said lowermost pan to be removed and a fresh pan to be inserted at the upper end of the stack.

2. Apparatus for extracting soluble constituents from vegetable matter comprising a fixed base, means supporting a head for vertical movement above the said base, a plurality of pans in communication with one another and adapted to form a stack supported on said base with the head closing the topmost pan, each pan having at least one opening in its base, means for providing fluid tight joints between the fixed base, the adjacent pans and the head to form a hermetic seal therebetween, means for introducing a liquid into the base for upward flow through the pans to an outlet in the head, lifting means for lifting the head away from the uppermost pan and then lifting all the pans except the lowermost, so that the lowermost pan can be displaced laterally from the stack and another pan inserted between the uppermost one in the stack and the head.

3. Apparatus according to claim 2, wherein a conveyor is provided to carry the fresh pans into position for insertion in the stack, and a ram is provided to displace the lowermost pan from the stack.

4. Apparatus according to claim 3, wherein valve means are interposed in said liquid introducing means for controlling the flow of liquid through the pans, the lifting means, the ram and valve means being controlled automatically by a timing mechanism so that pans are removed and inserted at predetermined intervals and the liquid flow is stopped during the removal and insertion of the pans.

5. Apparatus according to claim 1, wherein upwardly opening non-return valves are provided to control the openings in the bases of the pans and each pan has a mesh screen or screens provided in its base to restrain the upward flow of undissolved material and to prevent clogging of the non-return valves.

6. Apparatus according to claim 5, wherein the non-return valves comprises discs of flexible material secured at their centers to the upper surfaces of the pan bases and extending over apertures in the said bases.

7. Apparatus according to claim 1, wherein said sealing means is defined by each pan being formed with an upwardly facing groove in its upper edge to receive a packing ring adapted to engage a pan resting on it and to engage the undersurface of the head.

8. Apparatus according to claim 1, wherein each pan is formed with a downwardly facing groove around its bottom to receive a packing ring adapted to engage a pan on which it rests and to engage the base.

9. Apparatus according to claim 2, wherein the lifting means comprise a fluid-pressure operated ram acting on the head, lifting arms operatively connected to said ram to be operated thereby, said lifting arms being arranged to come into lifting engagement with the pan next to the lowermost pan after a predettermined upward movement of the head.

10. Apparatus according to claim 1, wherein the head is fixed, the means for effecting relative movement when actuated acting to lower the base with the lowermost pan resting therein, and to lower the remaining pans relative to the head.

11. Apparatus according to claim 1, wherein said base has a portion eccentrically pivoted thereon against which the lowermost pan rests so that when the stack of pans except the lowermost pan is moved the weight of the lowermost pan will cause said eccentric portion to tilt so that the lowermost pan is removed by gravity.

12. Apparatus according to claim 1, wherein the base, head and stack of pans are inclined to the vertical, said pans abutting against a guide member, and means disposed adjacent the base and head to feed a fresh pan at the upper end of the stack and to remove the lowermost pan under the effect of gravity.

13. Apparatus for passing a fluid medium through a stack of pans in hermetic sealed relationship with each other comprising a base member and a head having an inlet and outlet for the fluid medium, between which said stack of pans are disposed, each pan having at least one opening in the base thereof so that the stack of pans are in communication with one another, means provided for feeding additional pans toward said stack of pans, and means provided for effecting relative movement, in the direction of the axis of the stack of pans, of said head, said base member and said stack of pans except the lowermost pan thereof to enable this lowermost pan to be removed and one stack of pans between the stack of pans and said head.

14. Apparatus according to claim 13, in which said head is movable and said base member remains stationary.

15. Apparatus according to claim 13, in which said head is stationary and said base member is movable.

16. Apparatus according to claim 13, in which said head is movable and said base member is eccentrically mounted on pivot means so that the lowermost member through its weight on said base member will cause same to tilt around said pivot means when the remainder of said stack of pans is moved away from said base member and said lowermost pan is removed therefrom under the effect of gravity.

17. Apparatus according to claim 13, in which said stack of pans, said head and base member are inclined to the vertical, said stack of pans abutting against guide means, said means for feeding additional pans toward said stack of pans doing so under the effect of gravity, and means to receive the lowermost pan when the remainder of said stack of pans is moved therefrom under the effect of gravity.

18. Apparatus according to claim 13, in which a ram is provided to displace the lowermost pan from said stack of pans.

References Cited in the file of this patent

UNITED STATES PATENTS 1,551,855     Svendsgaard _____ Sept. 1, 1925

FOREIGN PATENTS 451,476     Great Britain _____ Aug. 6, 1936